May 19, 1970   H. FLEISSNER   3,512,265
PROCESS AND APPARATUS FOR THE CONTACT-FREE TREATMENT OF
MATERIALS WHICH CAN BE STRESSED
IN A LENGTHWISE DIRECTION
Filed Oct. 12, 1967   3 Sheets-Sheet 1
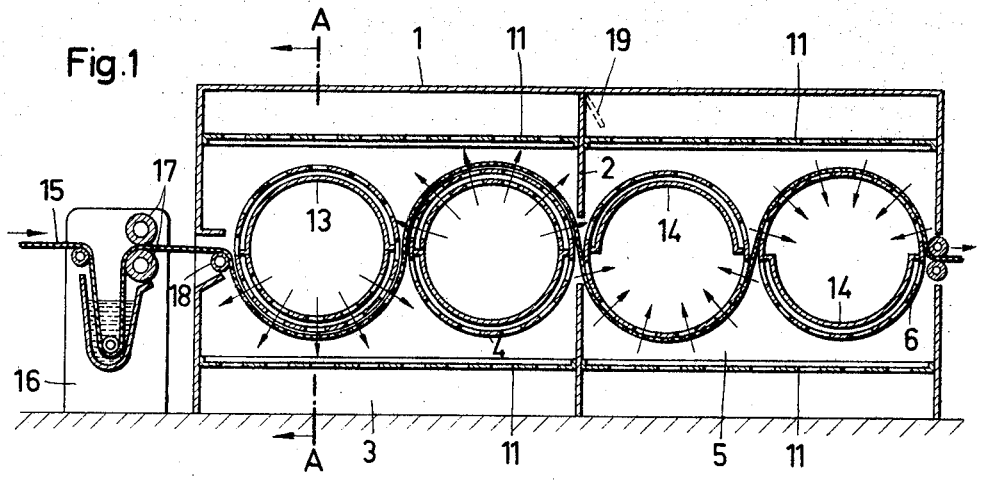
Fig.1
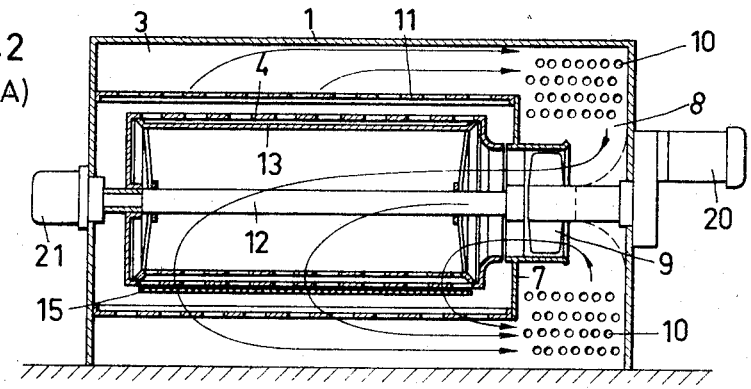
Fig.2 (A-A)
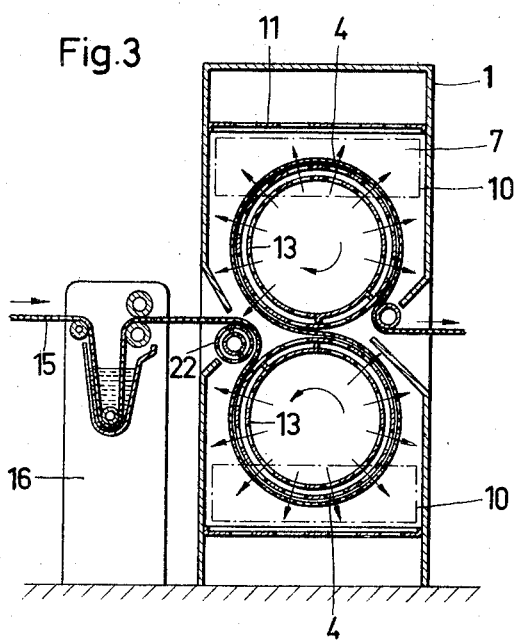
Fig.3
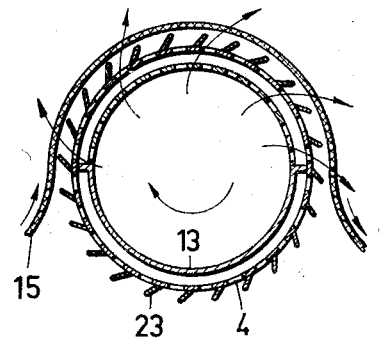
Fig.4
Inventor:
HANS FLEISSNER
BY: Craig & Antonelli
ATTORNEYS Inventor:
HANS FLEISSNER BY: Craig & Antonelli
ATTORNEYS May 19, 1970 H. FLEISSNER 3,512,265
PROCESS AND APPARATUS FOR THE CONTACT-FREE TREATMENT OF
MATERIALS WHICH CAN BE STRESSED
IN A LENGTHWISE DIRECTION
Filed Oct. 12, 1967 3 Sheets-Sheet 3

Inventor:
HANS FLEISSNER

BY: Craig & Antonelli
ATTORNEYS

United States Patent Office 3,512,265
Patented May 19, 1970

3,512,265
PROCESS AND APPARATUS FOR THE CONTACT-FREE TREATMENT OF MATERIALS WHICH CAN BE STRESSED IN A LENGTHWISE DIRECTION
Hans Fleissner, Frankfurt am Main, Germany, assignor to Vepa AG
Filed Oct. 12, 1967, Ser. No. 674,973
Claims priority, application Germany, Oct. 12, 1966, V 32,107; Nov. 4, 1966, V 32,260
Int. Cl. F26b 3/06
U.S. Cl. 34—10
10 Claims

ABSTRACT OF THE DISCLOSURE

The present disclosure relates to a process and apparatus for the heat-treatment, especially the drying or steaming of materials which can be stressed in the lengthwise direction. More particularly, the present disclosure is directed to the contact-free heat-treatment of materials wherein during at least a portion of the treatment process the material being treated is conveyed contact-free around at least one drum on a cushion of the treatment medium.

BACKGROUND OF THE INVENTION

The present invention relates to a process and apparatus for the contact-free heat-treatment, especially drying or steaming of materials which can be stressed in the lengthwise direction. More particularly, the present invention concerns the contact-free heat-treatment of materials, particularly lengths of materials which are exposed to the influence of a gaseous or vaporous treatment medium.

Apparatus with sieve drums subjected to a suction draft are well known. In these devices the material is held to the suction drums by the suction draft and even at high speeds it is guided crease-free. Also, in these devices a uniform and extremely intensive treatment is ensured. These devices serve for drying after washing processes, for drying impregnated and printed materials, in dyeing processes for drying and setting the dyestuffs, in finishing processes using synthetic resins and for curing and polymerizig the synthetic resin dispersions. In addition, these devices are used with success for bonding needled felt materials. However, difficulties are confronted in the case of impregnations with solutions which tend to stick or to smear and in dyeing when using dyestuffs which tend to migrate. Also, the drying of laminated material lengths is difficult on these devices if the material lengths are impermeable to air.

Furthermore, devices with sieve drums subjected to a suction draft are used for cooling and conditioning the material after heat-treatment processes. In these devices, the sieve drums are either arranged in one horizontal row or in one vertical row or the sieve drums are arranged staggered to each other in two rows. Generally, the material is guided over the drums alternately. However, it is also well known in these devices to guide the material unilaterally, preferably on the upper portions of the drums. This is important, for example, for tufted carpets in order to make sure that the pile is not compressed during the heat-treatment.

Also, devices containing sieve drums are well known in which the sieve drums are subjected to an excess pressure and which the treatment medium is blown out of the sieve drums and through the material lying around the sieve drums. In these devices wire mesh belts are passed around the sieve drums in order to force the material against the sieve drums. The wire mesh belts generally are subjected to a certain initial stress in order to force the material to be processed between the wire mesh belt and the drum jacket firmly against the sieve drum. However, these devices with blower drums incorporate the disadvantage that they are susceptible to trouble because of the use of the wire mesh belt and the fact that the air passage is somewhat impeded by the wire mesh belt, so that higher blower capacities must be installed or smaller drying capacities must be accepted. For this reason, such devices have not become popular in practice.

For materials which are to be treated contact-free, float-on-air dryers or drying ducts are generally used. The material is passed hanging vertically through the drying duct and treated by means of infrared radiators or by means of jetting. Also, drying ducts are well known in which infrared heating is combined with jetting. The float-on-air dryer as well as the drying duct have the substantial disadvantage that they allow only a limited operating speed, since at higher speeds the material has a tendency to exhibit an uncontrolled fluttering and thus cannot be effectively guided.

SUMMARY OF THE INVENTION

An object of the present invention is to avoid the prior art disadvantages in the contact-free heat-treatment of materials which can be stressed in the lengthwise direction.

Another object of the present invention is to provide an improved process and apparatus for the contact-free treatment of materials wherein crease-free material guidance of the material being treated can be achieved at high working speeds without the disadvantages of uncontrolled fluttering, and the like.

A further object of the present invention is to provide a contact-free treatment of materials which have been impregnated with solutions which tend to stick or to smear, or which have been dyed using dyestuffs which tend to migrate.

Other objects and further scope of applicability of the present invention will become apparent from the detailed description given hereinafter; it should be understood, however, that the detailed description and specific examples, while indicating preferred embodiments of the invention, are given by way of of illustration only, since various changes and modifications within the spirit and scope of the invention will become apparent to those skilled in the art from this detailed description.

Pursuant to the present invention, it has been found that the above-mentioned disadvantages may be eliminated and a much improved process and apparatus for the treatment of materials which can be stressed in the lengthwise direction can be obtained by conveying said materials on a treatment medium, for example, a gas such as air and/or a steam cushion, and by passing the material on this cushion, contact-free around at least one drum, preferably a sieve drum. In many cases, it is not necessary to guide the materials to be treated on a gas and/or a steam cushion, that is on the treatment medium during the entire treatment process, but rather it is sufficient if the contact-free treatment is effected during part of the treatment process, for example, in drying during the first drying stage or for the contact-free guidance of one material side. During the other part of the treatment, the material may be held and guided in the usual manner on the known conveying elements. It is advantageous if, for this purpose, sieve drums subjected to a suction draft are used, as on these sieve drums an extremely safe and desirable material guidance and an excellent treatment effect can be insured.

The treatment, according to the present invention, may be carried out, for example on a device with at least one sieve drum which is provided with a baffle in and/or around the sieve drum at that portion of said drum which is not covered with the material being treated and with a blower device which produces an excess pressure in the sieve drum. In order to ensure a contact-free material guidance, it is important that the capacity of the blower device is rated in such a way that the excess pressure in the sieve drum is higher than the material weight per unit of area. The material weight is, in this case, the weight of the material during the treatment, that is in the beginning of the treatment the weight of the wet material and at the end of the treatment, the weight of the almost dry material if the device is used for a drying process.

According to another embodiment of the present invention, it is suggested to design the device in such a way that the sieve drums can be used at option as suction drums or as blower drums. This may be achieved, for example, by correlating to the sieve drums and/or to each sieve drum at least one axial fan, the rotation of which can be readily reversed. The reversible axial fan can be arranged at one face of the sieve drum and may, when rotating in the one direction, draw the treatment medium out of the drum and, when rotating in the opposite direction, force the treatment medium into the drum. It is also possible to arrange one axial fan at each of the two faces of the sieve drum.

According to another feature of the present invention, the alternative use of the sieve drum as a suction drum or as a blower drum can be achieved with a sieve drum in which at least one fan and stationary parts are arranged which subject part of the drum to a suction draft and the other part to an excess pressure, and by having at option the suction side or the blower side of the drum and/or of the drum, which are arranged in one row or in two rows staggered to each other, covered by material by reversing the sense of rotation of the drums.

The apparatus is designed in such a way that the sieve drum may be optionally subjected to a suction draft or to an excess pressure. This has the advantage that threading of the forerunner can be effected automatically by first subjecting the drums to a suction draft until the forerunner leaves the treatment chamber at the discharge end and then by reversing the rotation of the fans in order to subject the drums to an excess pressure. Another advantage of the present invention is that such an apparatus can also be used for processing loose fibrous materials and any material which may or should not be stressed in tha lengthwise direction during the treatment, if the sieve drums are subjected to a suction draft when handling such materials.

In order to facilitate the transportation of the lengths of materials around the drums, it is suggested to provide the drums with slats or guide vanes which deflect the blowing air and/or the gaseous or vaporous treatment medium in the direction of material passage. If the deflection of the air in the direction of material passage is large enough, it is also possible to make the drums stationary when they are used as blower drums. Material transportation is then only effected by the air which is blown against the material obliquely and possibly by a traction element connected behind the drums. However, it is also possible to move the drums at a considerably higher speed than the material so that the treatment medium flowing out of the drums is deflected in the direction of material passage which facilitates material transportation.

In a further embodiment of the present invention it is suggested to provide the drums with guide vanes which are designed in such a way that the drum is effective as a fan and that an additional fan can be disposed of and/or the effect of the fan arranged, for example, at the face of the sieve drum is increased. In this design the drum has the functions of a fan and of a conveying element.

Instead of the guide vanes the drums may also be provided with nozzles directed in the direction of material passage. At the same time these nozzles may be designed and/or arranged in such a way that at the center of the working width they are inclined toward the drum sides or designed in such a way that they deflect the air toward the two drum sides or faces in order to obtain a spreading effect or to increase that effect. Instead of the sieve drums, slat drums containing slots through which the air can be blown out can also be used and nozzles may be arranged between the slats of the drums and/or mounted to these slats.

Especially with large working widths, it is advantageous if in the drum another stationary drum or parts are arranged which prevent the air or the steam from emerging at that portion of said drum which is not covered with the material being treated, thus serving as a baffle, and if at that portion of said drum which is covered with the material being treated, openings, for example, slits or perforations are provided. By using these parts in the drum a higher pressure is produced in the dum and thus the blowing effect over the working width is equalized.

An especially advantageous embodiment of the present invention is provided wherein a closed housing is subdivided by a transverse partition means into at least two treatment chambers containing drums, preferably sieve drums, whereby according to the present invention, blower drums are provided in one chamber and suction drums in the other chamber. Also, a subdivision into more than two chambers is also possible. In this case, blower drums are used, for example, for pre-drying, suction drums for the subsequent drying and in a last chamber at least one blower drum for cooling and conditioning. This apparatus offers the advantage that in the cooling zone the material is again properly spread and that it leaves the device in absolutely smooth condition and/or without creases.

In devices with blower drums and suction drums, it is expedient if the fans which are correlated to the faces of the drums are arranged in a special fan chamber. The air exchange, for example, on the counter-current principle, can be effected in a simple way by providing at least one opening in the transverse partition wall in the fan chamber. Through the opening the air and/or the treatment medium passes from the fan chamber which is subjected to an excess pressure into the fan chamber which is subjected to a suction draft. The air exchange can be controlled by providing the passage opening and/or openings with flaps which can be adjusted and closed.

If blower drums are to be used for shrinking processes in which full shrinkage of the material is desired, it is advantageous if the material is caused to flutter, since as a result of fluttering of the material a good shrinkage is facilitated. This may, for example, by effected by providing the second stationary drum in the sieve drum or in the slat drum with a few slits or rows of holes which are distributed over the circumference. However, it is also possible to correlate to the guide drum proper only a few slits so that the blowing air does not influence the material continuously but only periodically, thus causing the fluttering. These slits or rows of holes are preferably arranged in the axial direction. However, it is also advantageous if they are arranged helically on the drum.

At the inlet a roller will generally be provided as a guiding element. This roller may, for example, by a polished roller. However, it is also advantageous if the inlet roller is a blower roller and if the blowing effect is rated in such a way that a contact-free material feeding is ensured.

With a plurality of goods, for example, with printed fabric, tricot and with printed and dyed tufted carpets, fiber fleeces, non-wovens and the like, it is generally only necessary that the upper side of these materials does not come into contact with any conveying element or other part during the treatment in order to avoid smearing of the dyestuffs or a compression of the pile, for example, of tufted carpets, plushes and the like.

According to another feature of the present invention, it has been found that from materials which should only be supported unilaterally during the treatment, an alternate guidance around drums, preferably sieve drums, is also possible if these materials are alternately passed around a suction drum and around a blower drum, whereby the under side of these materials rests on the suction drum and the upper side is guided contact-free around the blower drums. With such an alternate arrangement of suction and blower drums, it is possible to guide material lengths at a high speed and crease-free over a plurality of drums and to have them intensely penetrated by the treatment medium. In an apparatus for this treatment, at least two drums, preferably sieve drums, are required in a treatment chamber in which a treatment medium is circulated, whereby the material is guided alternately around the drums. For this apparatus it is suggested to design the drums which guide the material on the upper portion as suction drums and the drums which guide the material at the lower portion as blower drums. It is desirable if at the discharge end a suction drum is arranged which pulls the material around the preceding blower drum which frequently can be mounted stationary. For a safe material guidance it is even more advantageous if the device has an odd number of drums, so that at the inlet and at the outlet end, one suction drum each is arranged.

The heat-insulated housing of such a device may be subdivided by means of a lengthwise partition into a chamber with suction and blower drums and into a fan chamber with fans which are correlated to the face of each sieve drum, whereby the fans are preferably accommodated in a housing with an air discharge opening and with an air inlet opening. In order to separate the circulated treatment medium currents of the suction drums and the blower drums from each other and to avoid the formation of eddy currents, it is suggested to subdivide the fan chamber by at least one partition into an upper and into a lower fan chamber and to arrange the fans of the suction drum in one (the upper) fan chamber and the fans of the blower drums in the other (the lower) fan chamber. The partitions may also be formed by the fan casings.

It is suggested to arrange radial fans for the suction drums and axial fans for the blower drums. However, it is also possible to provide axial fans for the suction drums and for the blower drums. It is advantageous if the blower drums have a small open area for air penetration which should amount to about 15 to 20% of the total drum area. The perforation should however be rather large and have a diameter of preferably about 10 to 20 mm.

BRIEF DESCRIPTION OF THE DRAWINGS

The present invention will become more fully understood from the detailed description given hereinbelow and the accompanying drawings which are given by way of illustration only and thus are not limitative of the present invention and wherein, FIG. 1 is a longitudinal sectional view of the apparatus of the present invention;

FIG. 2 is a cross-sectional view of the apparatus of FIG. 1 taken along line A—A;

FIG. 3 is a view of another embodiment of the apparatus of the present invention;

FIG. 4 is a section of another embodiment of a blower drum according to the present invention;

DESCRIPTION OF THE PREFERRED EMBODIMENTS

Figure 5:
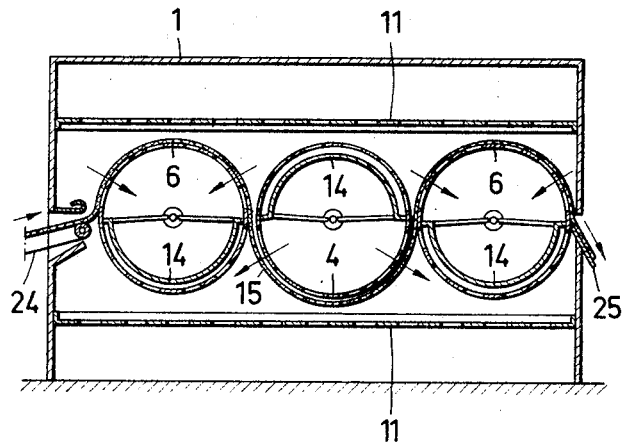
FIG. 5 is a longitudinal section of still a further embodiment of the apparatus of the present invention.

Referring now to the drawings wherein like reference numerals are used throughout the various views to designate like parts, the apparatus of the present invention comprises a heat-insulated housing 1 which is subdivided by a transverse partition 2 into a front treatment chamber 3 provided with blower drums 4 and into a rear treatment chamber 5 provided with suction drums 6. A lengthwise partition 7 separates the two treatment chambers 3 and 5 from a fan chamber 8. In this fan chamber, fan means 9 are each correlated to the face of each of the drum means 4 and 6. With drums 4 in treatment chamber 3, the fan blows the treatment medium, for example, air, steam, and/or steam-air mixtures into the sieve drums 4 and with drums 6 in the treatment chamber 5, the fan draws the treatment medium out of the drums. Above and beneath the sieve drums 4 and 6 sieve sheets 11 are provided. In each blower drum 4 another drum 13 is arranged on a stationary drum axis 12. This drum is impermeable to the treatment medium, for example, air, at that portion of the outer drum 4 which is not covered with the material being treated and perforated at that portion of said drum which is covered with said material. In the suction drums 6 stationary baffles 14 are mounted in a well known way at that portion of the drum which is not covered with the material being treated.

The apparatus according to FIGS. 1 and 2 is, for example, suitable for dry materials which have been impregnated with synthetic resin solutions or with a dyeing liquor. Material 15 is impregnated in a padder 16 and squeezed to a predetermined residual moisture content by means of squeeze rollers 17. Then it is passed via a highly polished, for example, electropolished roller 18 into the treatment chamber 3 where it is passed, contact-free over sieve drums 4 and pre-dried. If the material is dried to a certain moisture content, for example, to a residual moisture content of about 25 to 55%, it is in most cases effective to dry the material finally on drums 6 which are subjected to a suction draft and possibly, if for example, synthetic resins have been used, to cure it or if, for example, dispersed dyestuffs have been used, to Thermosol-dye it, that is to set the dyestuff.

The apparatus of the present invention may also be designed as a steamer. In this case a pre-fixation may take place in the front treatment chamber 3 and an after-fixation in the rear treatment chamber 5. For the generation of saturated steam a heated sump may be provided at the bottom of the housing. Generally, in order to enable an exchange of the treatment medium between the front chamber 3 and the rear treatment chamber 5, an opening (not shown) which can be adjusted and closed by means of a flap 19 is provided in partition 2 in the fan chamber. A drive 20 for the fans and a drive 21 for the sieve drums are mounted to the outside of the housing. With the blower drums 4 as well as with the suction drums 6 a continuous air circulation is ensured whereby the air of two adjacent sieve drums is well mixed as the air emerging from one sieve drum flows above and over the whole length of the treatment chamber 3 into the fan chamber, and the air which is discharged from the outer sieve drum downward is passed at the bottom into the fan chamber and drawn in by the two axial fans. Using this kind of air guidance system, the air is well mixed and equalized.

Another embodiment of the present invention is shown in FIG. 3. The material 15 is here again impregnated in a padder 16, then dried and/or treated on blower drums 4. In this device two blower drums are arranged one above the other, whereby said drums are substantially embraced by the material being treated. At the inlet, instead of using a polished roller, a blower roller 22 is arranged which is subjected to such a high excess pressure that the material 15 does not rest against this roller 22. The blower drums 4 are of the same design as those in the embodiment of the invention according to FIGS. 1 and 2 with a stationary drum 13 in the interior of drums 4 for equalizing the blowing effect over the working width. At least at one face of the blower drums 4 a reversible axial fan is provided which is separated from the treatment chamber by a partition means 7. Above and beneath the two fan means in the fan chamber, heater batteries 10 are arranged for heating up the treatment medium which is recirculated back to the fan chamber above and beneath the two sieve drums.

In FIG. 4 a blower drum 4 is shown which is provided at its circumference with obliquely situated slats or guide sheets 23 which deflect the air flowing out of the blower drum 4, so that it does not flow radially but rather obliquely against the material in the direction of material passage and thus facilitates transportation of the material. A more powerful flow in the direction of the material passage is obtained if the blower drum 4 moves at a higher speed than the material.

The apparatus according to the present invention is also suitable for drying and bonding laminated materials, whereby the material is preferably guided unilaterally on the drums and the laminated face is directed toward the blower drums.

In the apparatus according to FIG. 5, the material 15 to be processed is fed to the first suction drum 6 on a conveyor belt 24.

Figure 6:
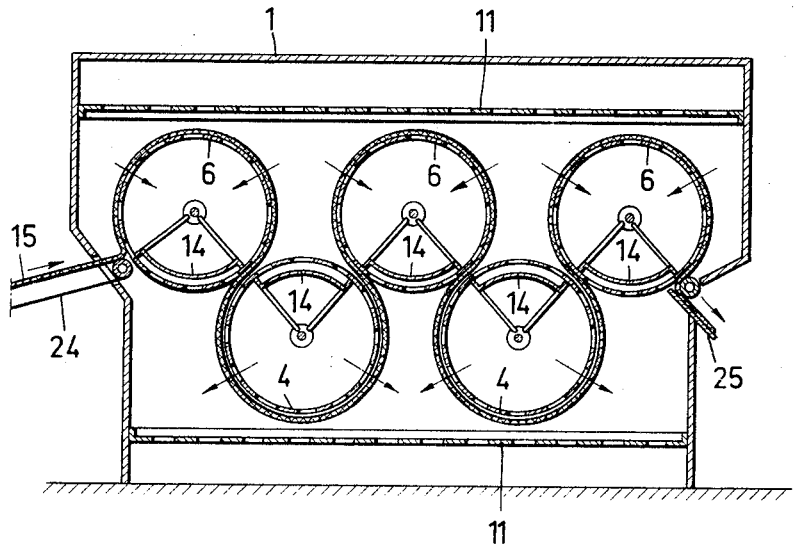
FIG. 6 is a longitudinal section of still another embodiment of the apparatus of the present invention.

In the apparatus according to FIG. 6, the suction drum 6 and the blower drums 4 are arranged in two rows staggered to each other, whereby in the upper row the suction drums 6 are arranged and in the lower row the blower drums 4 are arranged. At the discharge ends of the apparatus according to FIGS. 5 and 6 a chute 25 is arranged. Instead of a chute, however, a conveyor belt or a pair of rollers may also be arranged.

Figure 8:
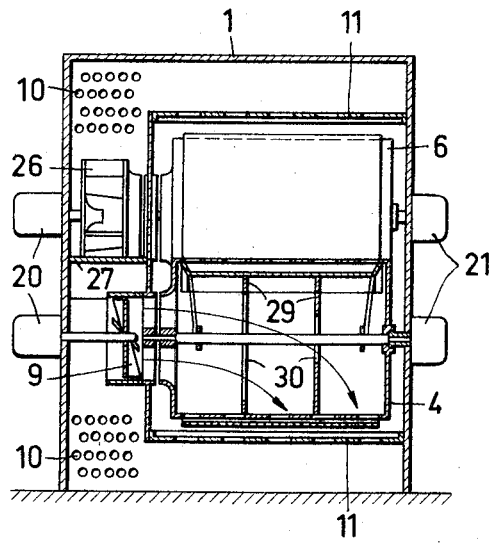
FIG. 8 is a cross-section of the apparatus according to FIGS. 6 and 7.
Figure 7:
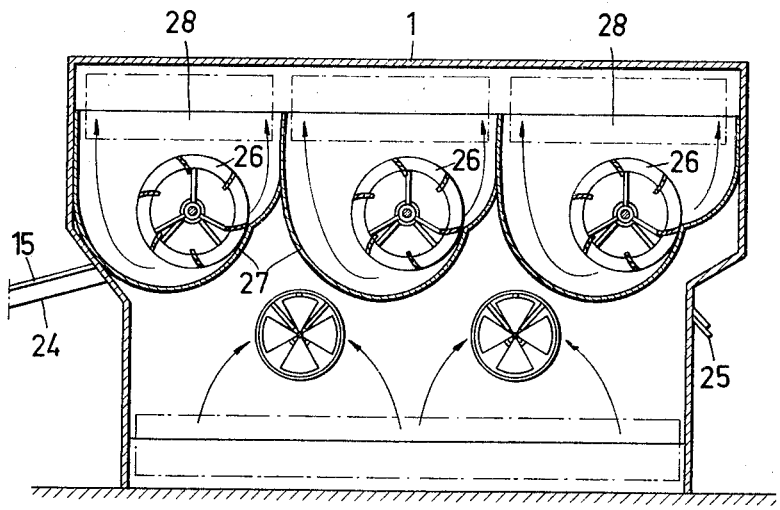
FIG. 7 is a longitudinal section of the fan chamber of the apparatus according to FIG. 6.

In the device according to FIGS. 6 to 8 radial fans 26 are each correlated to the face of each suction drum 6 and is provided with a casing 27 with a discharge opening 28 which is directed upwards. To the face of each blower drum 4 an axial fan 9 is correlated which draws the air out of the treament chamber and forces it into the blower drum 4. Drives 20 for the fans 9 and 26 are situated at the outside of housing 1. On the opposite side of the housing the drum drives 21 are mounted. To the fan means 9 and 26 heater batteries 10 are correlated for heating up the circulated treament medium.

In general, in the blower drums a baffle 14 may be provided at that portion of said drums which is not covered with the material being treated. This baffle is of the same design as the baffle 14 in the suction drums. For equalizing the treatment medium which is blown into the drum, it is possible especially with large working widths and relatively small drum diameters to arrange intermediate bottoms 29 in the drums which are preferably, adjustably mounted in the axial direction in the drum, said bottom being provided with opening 30 of different sizes. Also with this embodiment of the present invention, the fans may be arranged in the suction or blower drum and may, together with the stationary parts in the drum, subdivide the drums into a space with an excess pressure and into a space with a partial vacuum. Sieve drums of such design may optionally be used as suction drums or as blower drums by reversing the sense of rotation of the sieve drums, whereby the material which has been guided on the suction side using one direction of rotation cannot be guided on the blower side using the opposite direction of rotation. However, the diredtion of rotation of the fan may also be changed, whereby the space with the partial vacuum and the space with the excess pressure will change in the sieve drum.

The invention being thus described, it will be obvious that the same may be varied in many ways. Such variations are not to be regarded as a departure from the spirit and scope of the invention, and all such modifications are intended to be included within the scope of the following claims.

It is claimed:

1. A method for the heat-treatment of materials which can be stressed in the lengthwise direction which comprises introducing the material to be treated to the treatment chamber, conveying said material contact-free around at least one drum on a cushion of the treatment medium and on at least one suction drum subjected to a suction draft and removing the material from the treatment chamber.

2. The method of claim 1, wherein the material being treated is supported unilaterally and conveyed alternately around a suction drum and around a blower drum, whereby the underside of the material rests on the suction drums and the upper side is guided contact-free around the blower drums.

3. A method of heat-treatment materials which can be stressed in the lengthwise direction which comprises introducing the material to be treated to the treatment chamber, conveying said material contact-free on a cushion of air around at least one blower drum provided with a blower means which produces an excess pressure in the blower drum and subsequent conveying the material on the surface of at least one suction drum subjected to a suction draft.

4. The method of claim 3, wherein during the treatment the excess pressure in the blower drum is maintained at an amount larger than the material weight per unit of area.

5. The method of claim 3, wherein the blower drums can be converted to suction drums and the suction drums to blower drums by reversing the direction of rotation of the fan means.

6. The method of claim 5, wherein to facilitate threading of the forerunner of the material to be treated to the treatment chamber, the drums are subjected to a suction draft until said forerunner leaves the treatment chamber at the discharge end.

7. An apparatus for the treatment of materials which comprises a treatment housing containing more than one blower drum and more than one suction drum arranged in two rows staggered to each other whereby the suction drum are arranged in the upper row and the blower drums are arranged in the lower row, radial fan means correlated to the face of each suction dum and provided with a casing having an upwardly directed discharge opening, axial fan means correlated to the face of each blower drum which draws the treatment medium out of the treatment housing and forces it into the blower drum, means for introducing the material to the treatment housing, baffle means provide in the drum means at that portion of said drum which is not covered with the material being treated, and means for removing the material from the treatment housing.

8. The apparatus of claim 7, wherein the inlet means is a conveyor belt and the outlet means is a chute.

9. The apparatus of claim 7, wherein heating means is provided in the circulation path of the treatment medium.

10. The apparatus of claim 7, wherein intermediate bottom means are disposed in the drum means, said bottom means being adjustably mounted in the axial direction in the drum and provided with openings of different sizes.

(References on following page)

References Cited

UNITED STATES PATENTS

| | | | |
|---|---|---|---|
| 270,992 | 1/1883 | Snoeck | 34—115 X |
| 920,351 | 5/1909 | Layland et al. | 34—115 |
| 1,718,573 | 6/1929 | Millspaugh. | |
| 2,091,805 | 8/1937 | Chuse | 34—115 X |
| 2,416,027 | 2/1947 | Shields | 34—115 |
| 3,304,626 | 2/1967 | Leckner | 34—115 |
| 3,367,035 | 2/1968 | Tomlinson | 34—156 X |
| 3,065,098 | 11/1962 | Brooks | 34—156 X |
| 3,347,740 | 10/1967 | Goumeniouk | 34—156 X |

FOREIGN PATENTS 641,963  8/1950  Great Britain.

FREDERICK L. MATTESON, JR., Primary Examiner

R. A. DUA, Assistant Examiner

U.S. Cl. X.R.

34—115